(12) United States Patent
Liu et al.

(10) Patent No.: US 9,868,088 B2
(45) Date of Patent: *Jan. 16, 2018

(54) POROUS CATALYST WASHCOATS

(71) Applicant: BASF Corporation, Florham Park, NJ (US)

(72) Inventors: Xinsheng Liu, Edison, NJ (US); Esra Cinar, Clifton, NJ (US); Chunjuan Zhang, Scotch Plains, NJ (US); Pascaline Harrison Tran, Holmdel, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,944

(22) Filed: Dec. 22, 2016

(65) Prior Publication Data
US 2017/0100699 A1  Apr. 13, 2017

Related U.S. Application Data

(62) Division of application No. 13/786,870, filed on Mar. 6, 2013, now Pat. No. 9,561,495.

(51) Int. Cl.
*B01D 53/94* (2006.01)
*B01J 23/00* (2006.01)
(Continued)

(52) U.S. Cl.
CPC ..... *B01D 53/9459* (2013.01); *B01D 53/9477* (2013.01); *B01J 23/44* (2013.01);
(Continued)

(58) Field of Classification Search
CPC ... B01J 23/00; B01J 23/40; B01J 23/56; B01J 35/04; B01J 35/1061; B01J 35/1066;
(Continued)

(56) References Cited

U.S. PATENT DOCUMENTS

| 4,514,511 A | 4/1985 | Jacques et al. |
| 5,512,327 A | 4/1996 | Chakraborty |

(Continued)

FOREIGN PATENT DOCUMENTS

| CN | 101637721 | 2/2010 |
| CN | 101773830 | 7/2010 |

(Continued)

OTHER PUBLICATIONS

Agrafiotis et al., "The Effect of Powder Characteristics on Washcoat Quality. Part I: Alumina Washcoats," *Journal of the European Ceramic Society*, 2000, pp. 815-824, vol. 20.

(Continued)

*Primary Examiner* — Cam N. Nguyen
(74) *Attorney, Agent, or Firm* — Womble Bond Dickinson (US) LLP

(57) ABSTRACT

Catalyst washcoats with improved porosity and methods for making the washcoats are provided. The process comprises incorporation of an oil-in-water macroemulsion into the catalyst slurry prior to washcoating the carrier substrate, and calcining the washcoated carrier substrate to remove the oil-in-water macroemulsion. Also provided are catalyst articles comprising the washcoat and methods for abatement of exhaust gas emissions.

9 Claims, 2 Drawing Sheets

(51) Int. Cl.
| | |
|---|---|
| *B01J 23/40* | (2006.01) |
| *B01J 23/56* | (2006.01) |
| *B01J 35/04* | (2006.01) |
| *B01J 35/10* | (2006.01) |
| *B01J 23/46* | (2006.01) |
| *B01J 37/08* | (2006.01) |
| *B01J 37/02* | (2006.01) |
| *B01J 37/00* | (2006.01) |
| *B01J 23/83* | (2006.01) |
| *B01J 23/44* | (2006.01) |

(52) U.S. Cl.
CPC ............ *B01J 23/464* (2013.01); *B01J 23/83* (2013.01); *B01J 35/04* (2013.01); *B01J 35/1052* (2013.01); *B01J 35/1076* (2013.01); *B01J 37/0018* (2013.01); *B01J 37/0219* (2013.01); *B01J 37/0246* (2013.01); *B01J 37/0248* (2013.01); *B01J 37/08* (2013.01); *B01D 2255/102* (2013.01); *B01D 2255/1023* (2013.01); *B01D 2255/1025* (2013.01); *B01D 2255/2092* (2013.01); *B01D 2255/908* (2013.01); *B01D 2255/915* (2013.01); *B01D 2255/9202* (2013.01); *B01D 2255/9205* (2013.01); *Y10T 428/249979* (2015.04); *Y10T 428/25* (2015.01)

(58) Field of Classification Search
CPC .... B01J 37/0018; B01J 37/0219; B01J 37/08; B01D 53/9477
See application file for complete search history.

(56) References Cited

U.S. PATENT DOCUMENTS

| | | | |
|---|---|---|---|
| 6,734,144 B2 | 5/2004 | Varadaraj et al. | |
| 7,444,805 B2 | 11/2008 | Zuberi et al. | |
| 7,481,983 B2 * | 1/2009 | Patchett | B01D 53/9418 422/177 |
| 7,582,270 B2 | 9/2009 | Zuberi | |
| 7,718,567 B2 | 5/2010 | Hanaki | |
| 7,722,829 B2 * | 5/2010 | Punke | B01D 53/944 422/180 |
| 7,902,107 B2 * | 3/2011 | Patchett | B01D 5/0054 502/527.24 |
| 8,039,653 B2 | 10/2011 | Soane et al. | |
| 8,080,495 B2 | 12/2011 | Oljaca et al. | |
| 8,153,549 B2 | 4/2012 | Cho et al. | |
| 8,586,501 B2 | 11/2013 | Lewis et al. | |
| 8,703,865 B2 | 4/2014 | Ganschow et al. | |
| 8,833,064 B2 * | 9/2014 | Galligan | B01D 53/945 423/213.5 |
| 8,899,023 B2 * | 12/2014 | Patchett | B01D 5/0054 60/286 |
| 9,039,982 B2 * | 5/2015 | Patchett | B01D 5/0054 422/177 |
| 9,039,983 B1 * | 5/2015 | Patchett | B01D 5/0054 422/177 |
| 9,039,984 B1 * | 5/2015 | Patchett | B01D 5/0054 422/177 |
| 9,040,006 B1 * | 5/2015 | Patchett | B01D 5/0054 423/213.2 |
| 9,120,077 B2 * | 9/2015 | Wei | B01D 53/944 |
| 9,121,327 B2 * | 9/2015 | Patchett | B01D 5/0054 |
| 9,144,795 B2 * | 9/2015 | Patchett | B01D 5/0054 |
| 9,517,455 B2 * | 12/2016 | Patchett | B01D 5/0054 |
| 2011/0183221 A1 | 7/2011 | Serra Alfaro et al. | |
| 2012/0082606 A1 | 4/2012 | Lewis et al. | |

FOREIGN PATENT DOCUMENTS

| | | |
|---|---|---|
| CN | 102247826 | 11/2011 |
| JP | 07241471 | 9/1995 |
| JP | 2002-191988 | 7/2002 |
| JP | 2002-253968 | 9/2002 |

OTHER PUBLICATIONS

Agrafiotis et al., "The Effect of Powder Characteristics on Washcoat Quality. Part II: Zirconia, Titania Washcoats—Multilayered Structures," *Journal of the European Ceramic Society*, 2000, pp. 825-834, vol. 20.

Yang et al. "Synthesis of Spherical Hydroxyapatite Granules with Interconnected Pore Channels Using Camphene Emulsion," *Journal of Biomedical Materials Research, Part B: Applied Biomaterials*, John Wiley & Sons, Hoboken, NJ, vol. 99B, No. 1, 2011, pp. 150-157.

Zhang et al., "Creation of Three-Dimensionally Ordered Macropourous Au/CeO2 Catalysts with Controlled Pore Sizes and Their Enhanced Catalytic Performance for Formaldehyde Oxidation," *Applied Catalysis B: Environmental*, vol. 91, 2009, pp. 11-20.

* cited by examiner

POROUS CATALYST WASHCOATS

CROSS-REFERENCE TO RELATED APPLICATIONS

The present application is a divisional of U.S. patent application Ser. No. 13/786,870, filed Mar. 6, 2013, which is incorporated by reference herein in its entirety.

TECHNICAL FIELD

The invention relates to the field of catalyst washcoats and methods of making catalyst washcoats. The invention also relates to catalyst articles coated with catalyst washcoats and methods for using the catalyst articles for exhaust gas abatement.

BACKGROUND

In catalytic converters, a substrate is coated with a catalyst washcoat which contains the catalyst(s), catalyst supports, etc. High surface area is desirable in the washcoat to maximize catalysis. Other desirable washcoat properties include thermal stability and a pore size distribution that allows high flow-through of gases to optimize contact with the catalysts). In particular, use of fine particles in the washcoat can result in a dense washcoat layer with reduced porosity and impaired catalytic activity. In addition, dense nonporous washcoats may crack during heat treatment resulting in lack of adhesion and compromised durability.

There exists a need for catalyst washcoats with increased porosity, particularly catalyst washcoats that can be produced using simple methods that are easily incorporated into the manufacture of catalyst articles such as catalytic converters. The present invention addresses these needs.

SUMMARY

In one aspect, the invention relates to methods for increasing porosity in a catalyst washcoat. The methods comprise incorporating an aqueous oil-in-water (O/W) macroemulsion into a washcoat slurry containing the catalyst(s) and other components of the washcoat, washcoating a carrier substrate with the washcoat slurry, and calcining the washcoated carrier substrate to remove the macroemulsion. Upon calcination, the oil, water, and other organic components of the macroemulsion are burned off, and the oil macroparticles of the emulsion leave behind macropores in the calcined washcoat. In one or more embodiments, the O/W macroemulsion comprises an oil or other hydrophobic hydrocarbon, water or other aqueous phase, and a surfactant having a hydrophile-lipophile balance (HLB) of 8-16 or 10-12. In one or more specific embodiments, the O/W macroemulsion comprises mineral oil, a nonionic surfactant HLB 10-12, and water.

In a second aspect, the invention relates to catalyst washcoat compositions, wherein at least about 30% (i.e., 30-100%) of pores within the catalyst washcoat are about 15 μm-100 μm in size in at least one dimension or about 15 μm-100 μm in diameter if the pore is substantially spherical. In certain specific embodiments, at least about 70% (i.e., 70-100%) of the pores within the catalyst washcoat are about 15 μm-100 μm in size in at least one dimension or in diameter if the pore is substantially spherical. In further specific embodiments, at least about 30% (i.e., 30-100%), about 60% (i.e., 60-100%), or at least about 70% (i.e., 70-100%) of the pores within the catalyst washcoat are about 15 μm-50 μm in size in at least one dimension or in diameter if the pore is substantially spherical.

In a particular embodiment, catalysts and other solid components of the catalyst washcoat of the catalyst article can be selected for use in abatement of exhaust gas emissions. The emissions to be abated may be of any type for which a suitable catalyst is available. The catalyst should be capable of formulation as a washcoat slurry. For example, in certain specific embodiments, the catalyst washcoat may comprise catalysts for oxidation of hydrocarbons, carbon monoxide, and nitrogen oxides (NOx) in gasoline and diesel engines. In alternative embodiments, the catalyst washcoat may comprise catalysts for storage reduction of NOx (NSR catalysts) or catalysts for selective catalytic reduction of NOx to nitrogen (SCR catalysts) in exhaust gas emissions. In further specific embodiments, the catalyst components of the washcoat may be selected for abatement of exhaust gas emissions from industrial processes, such as methyl bromide, carbon monoxide, benzene, and volatile organic components (VOCs) including methane, toluene, xylene, acetic acid, methanol, etc.

In a further aspect, the invention relates to catalyst articles for use in abatement of exhaust gas emissions, wherein the catalyst article comprises a carrier substrate coated with the catalyst washcoat according to any of the catalyst washcoat embodiments and aspects described above. In one or more embodiments, the carrier substrate is a ceramic or metal structure having a honeycomb structure in which parallel gas flow passages extend through the structure from a fluid inlet to a fluid outlet. The walls of the passages are coated with the catalyst washcoat so that exhaust gases flowing through the passages contact the catalyst washcoat. The carrier substrate may be a wall flow monolith which has a plurality of longitudinally extending passages. The passages include inlet passages that have an open inlet end and a closed outlet end, and outlet passages that have a closed inlet end and an open outlet end. The walls forming the passages are porous, allowing exhaust gas to cross over from an inlet passage to an outlet passage to exit the monolith, thereby flowing through the catalyst washcoat on the walls. In one or more embodiments, the ceramic or metal carrier substrate may be in the form of pellets, corrugated sheets or in monolithic form coated with the catalyst washcoat.

In yet a further aspect, the invention relates to methods for abatement of exhaust gas emissions using the catalyst articles according to any of the foregoing aspects and embodiments of the invention. The exhaust gas containing the emissions to be abated is contacted with the catalyst article such that the catalyst washcoat contacts the exhaust gas in a manner effective to produce the desired catalytic conversion and abate the selected component or components of the exhaust gas.

In still another aspect, the invention relates to systems for abatement of exhaust gas emissions, wherein the system includes a catalyst article according to any of the foregoing embodiments and aspects. The system can include a catalyst article according to any of the embodiments and aspects described above, and one or more of a soot filter, a catalyzed soot filter, and/or additional conventional catalyst articles as desired. The components of the system for abatement of exhaust gas emissions are in fluid flow contact with the source of the exhaust gas and with each other. In certain embodiments, the exhaust gas stream flows from its source into sequential contact with the catalyst article of the invention and the other components of the system to achieve abatement of exhaust gas emissions.

DETAILED DESCRIPTION

Figure 1A:
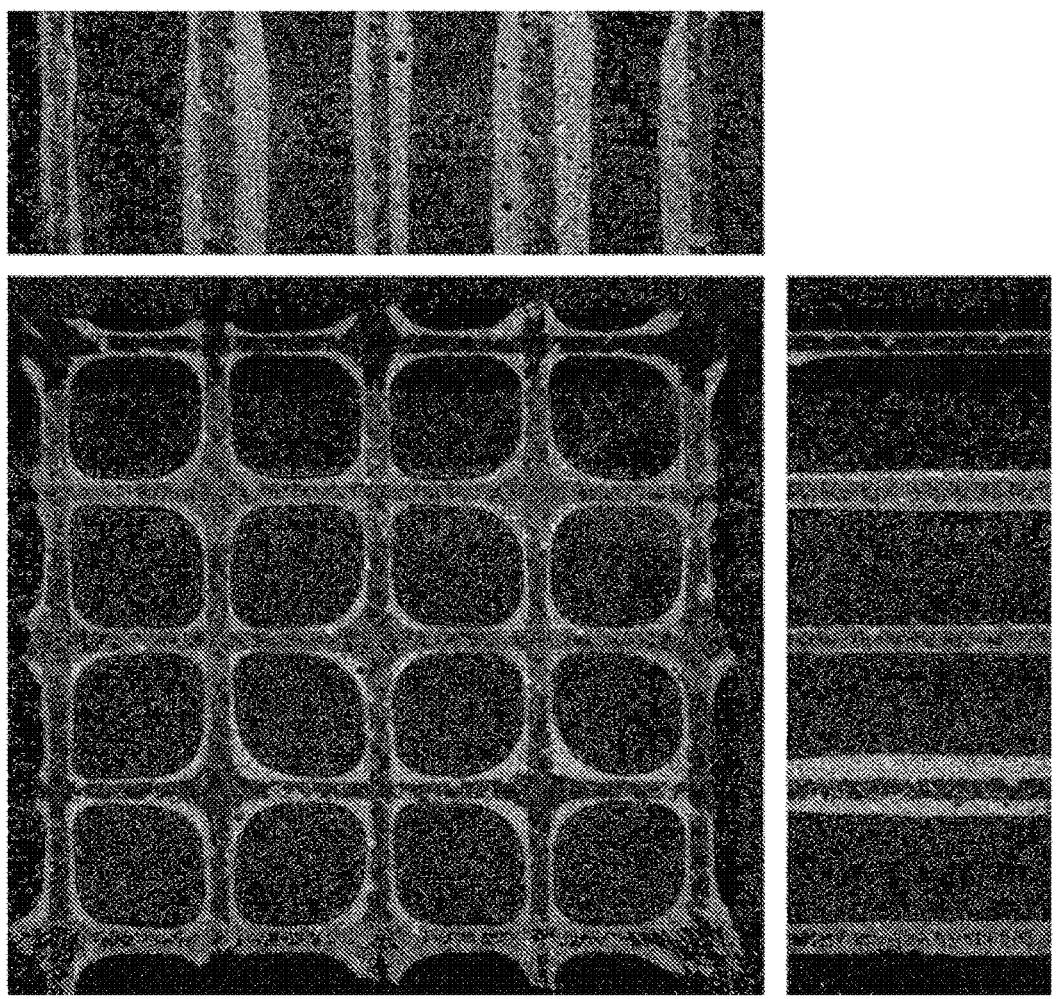
FIG. 1A is an X-ray microtomography (XMT) image of a honeycomb carrier substrate washcoated with a conventional catalyst washcoat and calcined, i.e., a catalyst washcoat that was not prepared with a macroemulsion.

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the term "within the catalyst washcoat" in connection with the pores of the washcoat refers to pores of the washcoat that are between the solid particles of the washcoat composition. The solid particles of the washcoat composition include the catalyst, refractory metal oxide supports, oxygen storage components, promoters, binders and the like. These solid particles may have an internal pore system in the particle itself. The pores of a support particle are used to impregnate catalysts and other components into the solid particle. The pores of the solid particles of the washcoat composition are typically micropores, which have dimensions in the nanometer range or at most 1-2 μm. In contrast, the pores "within the catalyst washcoat" of the invention are between the solid particles of the washcoat and are macropores which have a size of at least 15 μm in at least one dimension.

As used herein, the terms "macropore" and "macroporous" refer to a material having pores with a size equal to or greater than about 15 μm in at least one dimension. If the macropore is substantially spherical, the diameter of the macropore is equal to or greater than about 15 μm. The terms "micropore" and "microporous" refer to a material having pores with a size of less than about 10 μm in at least one dimension. If the micropore is substantially spherical, the diameter of the micropore is less than about 10 μm.

Similarly, as used herein, the term "macroparticle" with respect to an emulsion refers to the oil phase particles of the emulsion which have a diameter equal to or greater than about 15 μm. The term "microparticle" with respect to an emulsion refers to the oil phase particles of the emulsion which have a diameter of less than about 10 μm.

As used herein, the term "washcoat" has its usual meaning in the art of a thin, adherent coating of a catalytic or other material applied to a substrate carrier material, such as a honeycomb-type substrate or wire mesh, which is contacted by the gas stream being treated to effect removal of exhaust gas pollutants. A washcoat is formed by preparing a slurry containing a specified solids content of catalysts and/or carriers in a liquid vehicle, which is then coated onto a substrate and dried to provide a washcoat layer.

As used herein, the term "support" with respect to a catalyst refers to a material that receives platinum group metals, stabilizers, promoters, binders, and the like through association, dispersion, impregnation, or other suitable methods. Examples of supports include, but are not limited to, refractory metal oxides, high surface area refractory metal oxides and materials containing oxygen storage components. High surface area refractory metal oxide supports include activated compounds selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of materials containing oxygen storage components include, but are not limited to, ceria-zirconia, ceria-zirconia-lanthana, zirconia-praseodymia, yttria-zirconia, zirconia-neodymia and zirconia-lanthana. In certain embodiments, the support comprises bulk rare earth metal oxide such as bulk ceria having a nominal rare earth metal content of 100% (i.e., >99% purity).

As used herein, the terms "abate," "abatement" and the like, with respect to treatment of exhaust gas streams, refer to removal of or reduction in pollutants and/or toxic components in the exhaust gas.

In a first aspect, the invention relates to methods for increasing porosity in a catalyst washcoat. The methods comprise incorporating an aqueous oil-in-water (O/W) macroemulsion into a washcoat slurry containing the catalyst(s) and other components of the washcoat, washcoating a carrier substrate with the washcoat slurry, and calcining the washcoated carrier substrate to remove the macroemulsion. Upon calcination, the oil, water, and other organic components of the macroemulsion are burned off, and the oil macroparticles of the emulsion leave behind macropores in the calcined washcoat. To make the macroemulsion, a surfactant is added to the oil phase while stirring to produce a dispersion. The aqueous phase is then added slowly to the dispersion with an increased speed of stirring so that the mixture is turbulent. Vigorous, turbulent stifling is continued until sufficient aqueous phase has been added to produce the desired O/W emulsion, and for an additional time as necessary to produce a stable O/W macroemulsion. To obtain the stable O/W macroemulsion, the ratio of aqueous phase:oil:surfactant is selected such that about 30-100% of the oil particles are equal to or greater than about 15 μm in diameter in the macroemulsion.

The O/W macroemulsion is then incorporated into the catalyst washcoat slurry with stifling. The catalyst washcoat slurry may be any catalyst washcoat slurry known in the art, as determined by the intended end-use. In this manner, the aqueous phase of the O/W macroemulsion is incorporated into the aqueous catalyst washcoat slurry, and the oil macroparticles form droplets between the solid particles of the catalyst washcoat slurry. The catalyst washcoat slurry is then applied to a carrier substrate to form a layer on the surface of the carrier substrate, and calcined using methods customary in the field. The time and temperature of calcining are selected so that the oil components of the O/W macroemulsion (and the aqueous components of the washcoat slurry)

are burned off. This creates pores within the calcined washcoat that approximately represent the size and number of the oil particles in the O/W macroemulsion. That is, because the oil particles of the macroemulsion include a proportion of macroparticles, a similar proportion of macropores are formed within the calcined washcoat. The number and size of macropores in the calcined washcoat can be adjusted by selection of the oil and the surfactant (which affects oil particle size distribution) and by the amount of O/W macroemulsion incorporated into the catalyst washcoat slurry (which affects the number of pores formed).

The oil phase of the O/W macroemulsion may be any oil or other hydrocarbon suitable for forming a macroemulsion, or mixtures thereof. The carbon chain length of the oil or other hydrocarbon is related to the particle size in the emulsion, with larger molecules (i.e., longer carbon chain lengths) producing larger oil particles. However, oils having shorter carbon chain lengths are more easily removed by calcining. The practitioner can therefore select an oil or other hydrocarbon of appropriate carbon chain length to achieve the desired proportion of macroparticles in the macroemulsion, and can adjust the temperature and time of calcining to remove it from the catalyst washcoat. In one or more embodiments, the oil or other hydrocarbon has a carbon chain length of C6-C40, C10-C40, or is a mixture of hydrocarbons having carbon chain lengths in this range. By way of example, the oil/hydrocarbon phase may be mineral oil (a mixture of C15-C40 alkanes), hexane (C6), or mixtures thereof.

The surfactant of the O/W macroemulsion may be any surfactant known in the art for producing O/W emulsions. Anionic, cationic, nonionic and amphoteric surfactants can be used. In one or more embodiments, the surfactant is a nonionic surfactant having an HLB of 8-16 or 10-12. Use of nonionic surfactants in catalyst applications has the advantage of avoiding introduction of contaminating species such as Na, Cl, Br and S into the catalyst washcoat, which may compromise catalyst activity. The chain length of the surfactant affects the size of the oil particles of the emulsion, with longer chain lengths supporting formation of larger oil particles. The practitioner can therefore select a surfactant of appropriate chain length to achieve the desired proportion of oil macroparticles in the macroemulsion. By way of example, suitable surfactants include octylphenol ethoxylates (e.g., TRITON X surfactants), secondary alcohol ethoxylates (e.g., TERGITOL 15-S Series surfactants), branched secondary alcohol ethyoxylates (e.g., TERGITOL TMN Series surfactants), diethoxylates of tallow amine (e.g., SURFONIC T Series surfactants), ethoxylates of linear primary alcohols (e.g., SURFONIC L Series surfactants), and polyoxyethylene surfactants (e.g., TWEEN surfactants). In specific non-limiting examples, the surfactant is a nonionic surfactant selected from the group consisting of TRITON X-45 (HLB 9.8), TRITON X-114 (HLB 12.3), TERGITOL 15-S-5 (HLB 10.5), TERGITOL 15-S-7 (HLB 12.1), TERGITOL 15-S-12 (HLB 14.5), TERGITOL TMN-6 (HLB 13.1), SURFONIC T-20 (HLB 15.3), and SURFONIC L24-22 (HLB 16.6). In general, surfactants with HLB 10-12 are most suitable for macroemulsions utilizing mineral oil. The most suitable HLB for the surfactant depends on the particular oil used in the macroemulsion.

The aqueous phase of the O/W macroemulsion is typically water, such as deionized water.

In the O/W macroemulsion, the oil or other hydrocarbon, aqueous phase and surfactant are present in proportions that promote formation of a stable O/W macroemulsion. The aqueous phase is typically in excess, and the amount of surfactant is selected based on the amount of oil such that oil particles of the desired size are produced and stabilized in the aqueous phase (i.e., the amount of surfactant is an amount sufficient to stably emulsify the amount of oil that is present). In one or more embodiments, the 0/W macroemulsion is prepared so as to contain at least about 30% (i.e., 30-100%) oil phase particles about 15 μm-100 μm in diameter. In certain specific embodiments, at least about 70% (i.e., 70-100%) of the oil phase particles are about 15 μm-100 μm in diameter. In further specific embodiments, at least about 30% (i.e., 30-100%), at least about 60% (i.e., 60-100%), or at least about 70% (i.e., 70-100%) of the oil phase particles are about 15 μm-50 μm in diameter.

In one or more embodiments, the O/W macroemulsion comprises 58-62% water, 30-40% mineral oil, and 4-6% TRITON X-45 or TRITON X-114. In one or more further embodiments, the O/W macroemulsion comprises about 60% DI water, about 35% mineral oil, and about 5% TRITON X-45.

The catalyst washcoat slurry may be any catalyst washcoat slurry known in the art that is suitable for washcoating a carrier substrate. The slurry may comprise one or more selected catalysts, including precious group metal catalysts, base metal catalysts, SCR catalysts, and/or zeolites. The one or more catalysts may be impregnated on support materials, including refractory metal oxides (e.g., alumina, rare-earth metal oxides, zirconia, titania and combinations thereof) or oxygen storage components such as ceria. The washcoat slurry may further include other components of the catalyst washcoat, such as promoters and binders.

The O/W macroemulsion is incorporated into the catalyst washcoat slurry in an amount selected to obtain the desired degree of macroporosity in the calcined washcoat. The degree of macroporosity in the calcined washcoat is determined by the proportion of oil macroparticles in the macroemulsion as compared to microparticles, and the amount of O/W macroemulsion added to the catalyst washcoat slurry. In one or more embodiments, the O/W macroemulsion constitutes about 2% to about 50% of the catalyst washcoat slurry. In other embodiments, the O/W macroemulsion constitutes about 2% to about 15% of the catalyst washcoat slurry. In further embodiments, the O/W macroemulsion constitutes about 5% of the catalyst washcoat slurry.

After mixing the O/W macroemulsion with the catalyst washcoat slurry, the catalyst washcoat is formed on the carrier substrate using conventional methods such as dipping the carrier in the catalyst washcoat slurry. The carrier substrate may be any of the known carrier substrates and is selected according to the intended end-use of the catalyst article. For example, the carrier substrate may be ceramic or metal. The carrier substrate may be a monolithic substrate of the honeycomb type having fine, parallel gas flow passages extending therethrough from an inlet or an outlet face of the substrate such that passages are open to fluid flow therethrough. The passages are essentially straight paths from their fluid inlet to their fluid outlet, and are defined by walls on which the catalytic material is coated as a washcoat so that the gases flowing through the passages contact the catalytic material. Wall flow carrier substrates are particularly useful as carrier substrates for the macroporous washcoats of the invention, as the walls of the parallel passages of these substrates are porous so that the exhaust gas flows through the washcoat and the walls of the passages into an adjacent passage before exiting the monolith. Ceramic substrates may be made of any suitable refractory material, e.g., cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like. Metallic substrates may be composed of one or more metals or metal alloys, and may be in various shapes such as pellets, corrugated sheets or monolithic form. Specific examples of metallic substrates include the heat-resistant, base-metal alloys, especially those in which iron is a substantial or major component. Such alloys may contain one or more of nickel, chromium, and aluminum.

The washcoated carrier substrate is then calcined using a time and temperature sufficient to both thermally treat the catalyst and remove the components of the O/W macroemulsion. Temperatures between 300° C. and 700° C. for 1 hr. to 4 hr. in air are generally sufficient for this purpose. In one or more embodiments, the carrier substrate washcoated with the catalyst washcoat/O/W macroemulsion is calcined for 1-2 hr. at 400-500° C.

The above processes produce a catalyst washcoat composition on the carrier substrate (the catalyst article) wherein at least about 30% (i.e., 30-100%) of pores within the catalyst washcoat are about 15 μm-100 μm in size in at least one dimension or about 15 μm-100 μm in diameter. In certain specific embodiments, at least about 70% (i.e., 70-100%) of the pores within the catalyst washcoat are about 15 μm-100 μm in size in at least one dimension or in diameter. In further specific embodiments, at least about 30% (i.e., 30-100%), about 60% (i.e., 60-100%), or at least about 70% (i.e., 70-100%) of the pores within the catalyst washcoat are about 15 μm-50 μm in size in at least one dimension or in diameter.

The catalyst article with the macroporous catalyst washcoat is useful for abatement of exhaust gas emissions. The emissions to be abated may be of any type for which a suitable catalyst is available, provided the catalyst can be formulated as a washcoat slurry. For example, in certain specific embodiments, the washcoat of the catalyst article may comprise catalysts for oxidation of hydrocarbons, carbon monoxide, and nitrogen oxides (NOx) in the exhaust streams of gasoline and diesel engines. In alternative embodiments, the washcoat of the catalyst article may comprise catalysts for storage reduction of NOx (NSR catalysts) or catalysts for selective catalytic reduction of NOx to nitrogen (SCR catalysts) in the exhaust streams of gasoline and diesel engines. In further specific embodiments, the washcoat of the catalyst article may comprise catalysts for abatement of exhaust gas emissions from industrial processes, such as methyl bromide, carbon monoxide, benzene, and volatile organic components (VOCs) including methane, toluene, xylene, acetic acid, methanol, etc. The exhaust gases to be abated are contacted with the catalyst article such that the catalyst washcoat contacts the exhaust gas in a manner effective to produce the desired catalytic conversion and abate the selected component or components of the exhaust gases. Catalytic conversion of pollutants and toxins in the exhaust gases is improved by the macroporosity of the catalyst washcoats of the invention due to improved flow-through and surface area contact with the catalyst.

The catalyst article according to the invention may be included in a system for abatement of exhaust gases. In addition to the catalyst article of the invention, such systems may further include one or more of a soot filter, a catalyzed soot filter, and additional conventional catalyst articles as desired. The components of the system for abatement of exhaust gas emissions are in fluid flow communication with the source of the exhaust gas and with each other such that the exhaust gas stream flows from its source into sequential contact with the catalyst article of the invention and the other components of the system to achieve abatement of exhaust gas emissions.

EXAMPLE

An oil-in-water emulsion was prepared using the following materials:

| Material | Amount (g) | Percent of Emulsion |
|---|---|---|
| DI Water | 27.5 | 61.11 |
| Surfactant: Triton X-45 | 2.5 | 5.5 |
| Mineral Oil | 15 | 33.33 |

The mineral oil was weighed out in a glass beaker, and the surfactant was added while stirring with a magnetic stir bar. The DI water was weighed out in a separate beaker. The speed of stirring of the oil/surfactant mixture was increased so that turbulence formed a vortex. The water was slowly added dropwise to the oil/surfactant mixture until all water was added, and mixing was continued for an additional 10 minutes to obtain the O/W macroemulsion. Analysis of the particle size distribution of the O/W macroemulsion showed that it contained a minimum of about 30% of oil particles equal to or greater than about 15 μm in diameter.

The O/W emulsion was then incorporated into a catalyst slurry as follows:

| Material | Amount (g) | % of total slurry |
|---|---|---|
| O/W emulsion | 12.5 | 5.06 |
| Slurry (Pd/Alumina + Rh/OSC) | 234.58 | 94.94 |

The catalyst slurry was thoroughly mixed by shaking the container and mixing by hand. The emulsion was similarly mixed thoroughly, and added in the specified amount to the slurry while mixing thoroughly. Cordierite carrier substrates were washcoated with the catalyst/O/W emulsion slurry and calcined at 500° C. for 2 hrs.

For comparison, a catalyst slurry having the same composition was prepared, but was not mixed with the O/W emulsion. This comparison slurry was also washcoated on cordierite carrier substrates and calcined at 500° C. for 2 hrs.

Figure 1B:
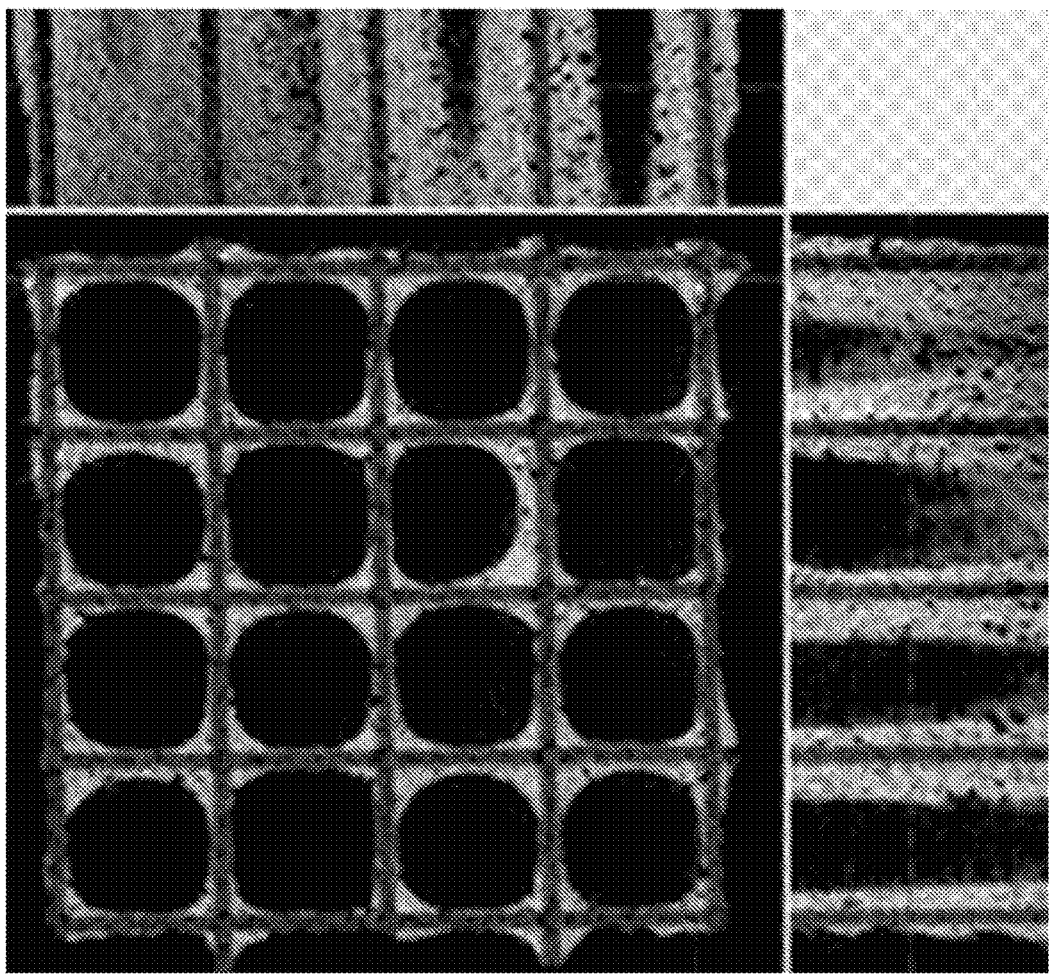
FIG. 1B is an X-ray microtomography (XMT) image of a honeycomb carrier substrate washcoated with a catalyst washcoat according to the invention and calcined, i.e., a catalyst washcoat that was prepared with a macroemulsion.

XMT images of the resulting washcoats are shown in FIG. 1A and FIG. 1B. FIG. 1A shows the washcoat without incorporation of the macroemulsion. The panel on the right side is a longitudinal section of the passages, where the washcoat is seen as lighter layers on each side of the darker walls of the parallel passages. The washcoat layers are thin and dense, with very little porosity. In contrast, FIG. 1B shows the washcoat prepared with the O/W macroemulsion. The washcoat layers are thicker and appear spongy, with a large number of pores in the macroporous size range.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyst article comprising a catalyst washcoat on a carrier substrate, wherein about 30%-100% of pores within the catalyst washcoat are about 15 μm-100 μm in size in at least one dimension.

2. The catalyst article of claim 1, wherein about 70%-100% of the pores within the catalyst washcoat are about 15 μm-100 μm in size in at least one dimension.

3. The catalyst article of claim 1, wherein about 70%-100% of the pores within the catalyst washcoat are about 15 μm-50 μm in size in at least one dimension.

4. The catalyst article of claim 1, wherein the carrier substrate is cordierite or metal.

5. The catalyst article of claim 1, wherein the catalyst washcoat comprises a precious group metal catalyst and/or a base metal catalyst.

6. The catalyst article of claim 5, wherein the precious group metal catalyst and/or base metal catalyst is impregnated on a support material.

7. A system for abatement of exhaust gas emissions comprising a source of exhaust gases in fluid flow communication with a catalyst article according to claim 1, and at least one of a soot filter, a catalyzed soot filter and a second catalyst article in fluid flow communication with the catalyst article.

8. The system of claim 7, wherein the carrier substrate is a ceramic or metal honeycomb substrate.

9. The system of claim 8, wherein the carrier substrate is a flow-through monolithic substrate or a wall flow substrate.

* * * * *

UNITED STATES PATENT AND TRADEMARK OFFICE
CERTIFICATE OF CORRECTION

PATENT NO. : 9,868,088 B2
APPLICATION NO. : 15/388944
DATED : January 16, 2018
INVENTOR(S) : Xinsheng Liu et al.

It is certified that error appears in the above-identified patent and that said Letters Patent is hereby corrected as shown below:

On the Title Page

In page 2, Column 1, Item (56), references cited, US Patent Documents, 7,718,567 B2, delete "Hanaki" and insert --Hanaki et al.--, therefor.

Signed and Sealed this
Twentieth Day of March, 2018

Andrei Iancu
*Director of the United States Patent and Trademark Office*